(12) United States Patent
Ikeda et al.

(10) Patent No.: US 8,867,815 B2
(45) Date of Patent: Oct. 21, 2014

(54) SAMPLE IDENTIFICATION DEVICE AND SAMPLE IDENTIFICATION METHOD

(75) Inventors: Takahiro Ikeda, Hamamatsu (JP); Hidenao Iwai, Hamamatsu (JP); Toyohiko Yamauchi, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 1015 days.

(21) Appl. No.: 12/808,907

(22) PCT Filed: Nov. 7, 2008

(86) PCT No.: PCT/JP2008/070331
§ 371 (c)(1),
(2), (4) Date: Aug. 23, 2010

(87) PCT Pub. No.: WO2009/081661
PCT Pub. Date: Jul. 2, 2009

(65) Prior Publication Data
US 2011/0229008 A1    Sep. 22, 2011

(30) Foreign Application Priority Data
Dec. 21, 2007  (JP) .............................. P2007-330468

(51) Int. Cl.
G06K 9/00  (2006.01)
G02B 21/36  (2006.01)

(52) U.S. Cl.
CPC ............ *G02B 21/365* (2013.01); *G02B 21/368* (2013.01)
USPC ....................................................... 382/133

(58) Field of Classification Search
None
See application file for complete search history.

(56) References Cited

U.S. PATENT DOCUMENTS

| | | | | |
|---|---|---|---|---|
| 4,430,897 A | * | 2/1984 | Quate | 73/606 |
| 4,510,810 A | * | 4/1985 | Kanda et al. | 73/606 |
| 7,120,281 B2 | * | 10/2006 | Olschewski et al. | 382/128 |
| 7,146,372 B2 | * | 12/2006 | Bacus et al. | 1/1 |
| 7,711,174 B2 | * | 5/2010 | Sammak et al. | 382/133 |
| 2005/0244020 A1 | * | 11/2005 | Nakajima et al. | 381/151 |

FOREIGN PATENT DOCUMENTS

| | | | | |
|---|---|---|---|---|
| GB | 2238619 A | * | 6/1991 | ............ G01N 27/26 |
| JP | 4-504055 | | 7/1992 | |
| JP | 10-321179 | | 12/1998 | |
| JP | 11-219130 | | 8/1999 | |
| JP | 2002-78995 | | 3/2002 | |
| JP | 2004-46 | | 1/2004 | |
| JP | 2006-71430 | | 3/2006 | |
| WO | 2006/112210 | | 10/2006 | |

OTHER PUBLICATIONS

Michio Matsuhashi et al., "Production of sound waves by bacterial cells and the response of bacterial cells to sound," J. Gen. Appl. Microbiol, 1998, pp. 49-55, vol. 44, No. 1.

* cited by examiner

*Primary Examiner* — Robert Morgan
*Assistant Examiner* — Michael Tomaszewski
(74) *Attorney, Agent, or Firm* — Drinker Biddle & Reath LLP

(57) ABSTRACT

A cell stethoscope 1 comprises a sample image input section 31 for inputting image information of a cell, an image display part 50 for displaying the image information to an observer, an area designation part 40 for designating a fixed area included in the image information in response to an operation carried out by the observer according to the image information displayed by the image display part 50, a frequency conversion section 32 for frequency-converting vibration information of the cell in the fixed area designated by the area designation part 40 into sound information, and a sound output part 60 for outputting the sound information frequency-converted by the frequency conversion section 32 to the observer.

15 Claims, 9 Drawing Sheets

SAMPLE IDENTIFICATION DEVICE AND SAMPLE IDENTIFICATION METHOD

TECHNICAL FIELD

The present invention relates to a sample identification device and a sample identification method.

BACKGROUND ART

Recent development in biotechnology has made it routine to carry out artificial insemination and tissue engineering clinically. On such a site, it is preferable to identify so-called "lively" cells rapidly and efficiently. Typically, such identification is conducted by an observer who sees captured or measured results of cells with a naked eye and selects those exhibiting a greater number of vibrations per unit time, for example, as "lively" cells.

Patent Literature 1 discloses an example of devices for an observer to view cells and identify them. In Patent Literature 1, vibration signals of cells are subjected to frequency conversion by a spectrum analyzer or the like, and its results are displayed on an oscilloscope. Therefore, the observer using the device described in Patent Literature 1 can identify so-called "lively" cells by seeing the output screen of the oscilloscope.

Patent Literature 1: Japanese Translated International Patent Application Laid-Open No. 4-504055

DISCLOSURE OF INVENTION

Technical Problem

For identifying a cell having a desirable vibration state by using the above-mentioned device of Patent Literature 1, the observer initially adjusts the position of a cell placed on a sample holding table while locating a viewpoint at the cell, so as to define an area to be observed (step S001). Subsequently, the observer sees information displayed on the oscilloscope and determines whether or not a cell in a desirable vibration state exists (step S002). That is, the observer must shift the viewpoint once to the display screen of the oscilloscope after the position adjustment in step S001. Further, when no cell in the desirable state exists in the determination at step S002, the observer must return the viewpoint to the cell placed on the sample holding table and then restart the observation area defining procedure at step S001. Even when a cell in the desirable vibration state is found in the determination at step S002, on the other hand, the observer must return the viewpoint to the cell placed on the sample holding table in order to carry out the next cell identification starting from step S001. Thus, there is a fear that the above-mentioned device of Patent Literature 1 may lower its working efficiency, e.g., lower the operation speed by frequently changing the viewpoint.

In view of the foregoing, it is an object of the present invention to provide a sample identification device and a sample identification method which can enhance the working efficiency when identifying a sample having a desirable vibration state.

Solution to Problem

For achieving the above-mentioned object, the sample identification device in accordance with the present invention comprises image input means for inputting image information of a sample; image display means for displaying the image information to an observer; area designation means for designating a fixed area in the image information in response to an operation carried out by the observer according to the image information displayed by the image display means; conversion means for frequency-converting vibration information of the sample in the fixed area designated by the area designation means into sound information; and sound output means for outputting the sound information frequency-converted by the conversion means to the observer.

The sample identification method in accordance with the present invention comprises an image input step for sample image input means to input image information; an image display step for image display means to display the image information to an observer; an area designation step for area designation means to designate a fixed area in the image information in response to an operation carried out by the observer according to the image information displayed by the image display means; a conversion step for conversion means to frequency-convert vibration information of the sample in the fixed area designated by the area designation means into sound information; and a sound output step for sound output means to output the sound information frequency-converted by the conversion means to the observer.

Such sample identification device and method in accordance with the present invention allow the observer to designate an area to be identified while locating a viewpoint at the image display means, and identify a sample while hearing a sound issued from the sound output means. That is, without shifting the viewpoint between the time for designating a subject to be identified and the time for identification, the observer can identify the sample according to the output sound from the sound output means. This prevents the viewpoint from frequently shifting in the sample identification procedure, whereby the present invention can enhance the working efficiency when identifying a sample having a desirable vibration state.

The present invention also allows the observer to designate an area to be identified while viewing an image displayed by the image display means. That is, at the same viewpoint as that at the time of identifying a sample, the observer can designate a partial area in an area representing the sample without moving the sample itself. This enhances the operability and throughput, whereby the working efficiency can further be raised.

In the present invention, the conversion means may comprise a frequency converter including at least one multiplier, while a differentiator may be disposed in front of or behind the multiplier in the frequency converter.

In this case, the differentiator is disposed in front of or behind the multiplier. Incorporating the differentiator acting to suppress a DC component and emphasize a change into the conversion means of the present invention allows the observer to hear a louder sound when the change in cell vibration is greater. As a result, the observer can acquire information concerning the vibration speed of the sample more efficiently, whereby the working efficiency increases.

In the present invention, the conversion means may comprise a plurality of frequency converters and an adder for adding outputs from the plurality of frequency converters.

In this case, the plurality of frequency converters included in the conversion means can perform frequency conversion processes in parallel, while the adder adds the outputs from the plurality of frequency converters. As a consequence, the conversion means can convert the vibration information of the sample into sound information rapidly and efficiently for a plurality of frequency bands as well.

In the present invention, the conversion means may further comprise means for converting a strength in the frequency-converted sound information into a pitch in the sound information.

In this case, the sound output means can provide the observer with sound information in which the strength is converted into a pitch by the conversion means. As a result, the observer can acquire information concerning the vibration speed of the sample more efficiently, whereby the working efficiency improves.

In the present invention, when a sound outputted to the observer changes within a predetermined time interval, the sound output means may keep outputting the sound before the change as a reverberant sound during the predetermined time interval.

In the present invention, the predetermined time interval may be 2 ms.

In these cases, when the output sound of the sound output means changes in an interval shorter than a time interval corresponding to the time resolution of human auditory sense, i.e., when the observer cannot recognize the change in the output sound of the sound output means, the sound output means keeps outputting the output sound before the change as a reverberant sound during the time interval corresponding to the time resolution of human auditory sense. As a consequence, the sound output means allows the observer to recognize even an output sound changed in an interval shorter than the time interval corresponding to the time resolution of human auditory sense. This is useful in particular when the time interval corresponding to the time resolution of human auditory sense is set to 2 ms.

In the present invention, the image input means may input the image information of the sample from a phase-contrast microscope and a two-dimensional photodiode array.

This makes it possible to identify a sample in a minute vibration state at a high frequency.

In the present invention, the image input means may input the image information of the sample from a database storing the image information of the sample beforehand.

This makes it possible to identify the sample according to the vibration information of the sample acquired beforehand even offline.

Advantageous Effects of Invention

The present invention can provide a sample identification device and a sample identification method which can enhance the working efficiency when identifying a sample having a desirable vibration state.

REFERENCE SIGNS LIST 1, 2 ... cell stethoscope; 10 ... phase-contrast microscope; 20 ... CCD camera; 30 ... calculation part; 31 ... sample image input section; 32 ... frequency conversion section; 321 ... time-series data generator; 322 ... frequency conversion circuit; 323 ... VF converter; 40 ... area designation part; 50 ... image display part; 60 ... sound output part; 701, 707, 711 ... high-pass filter; 702, 705, 708, 713 ... amplifier; 703, 706 ... multiplier; 704 ... low-pass filter; 709 ... differentiator; 710 ... adder; 712 ... converter device; 80 ... two-dimensional PD array; 90 ... image database

DESCRIPTION OF EMBODIMENTS

In the following, preferred embodiments of the sample identification device and method in accordance with the present invention will be explained in detail with reference to the accompanying drawings. In the explanation of the drawings, the same constituents will be referred to with the same signs, while omitting their overlapping descriptions.

First Embodiment

Overall Structure of a Cell Stethoscope 1

Figure 1:
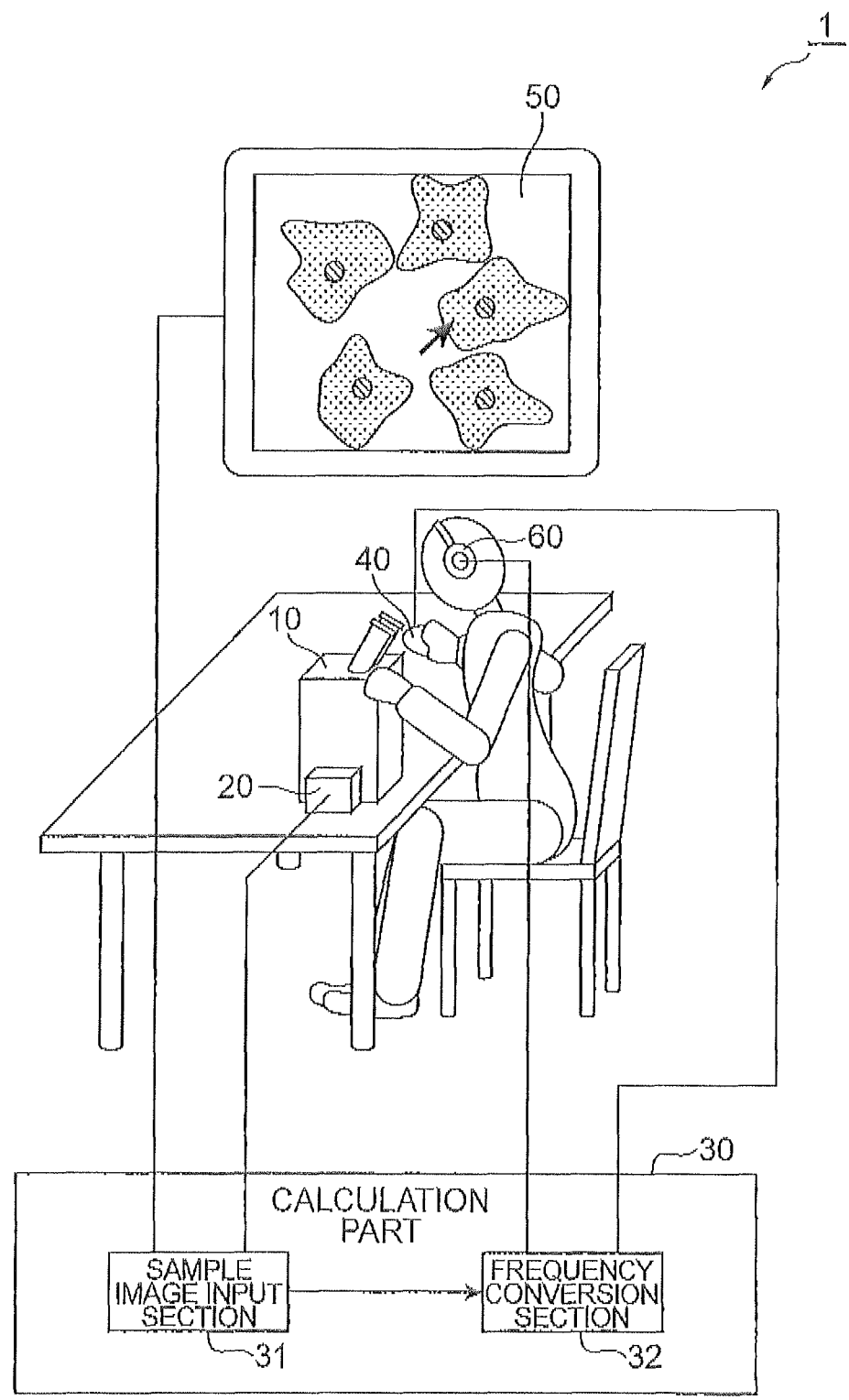
FIG. 1 is a functional block diagram imaging the structure of a cell stethoscope 1 in accordance with a first embodiment of the present invention.
Figure 2:
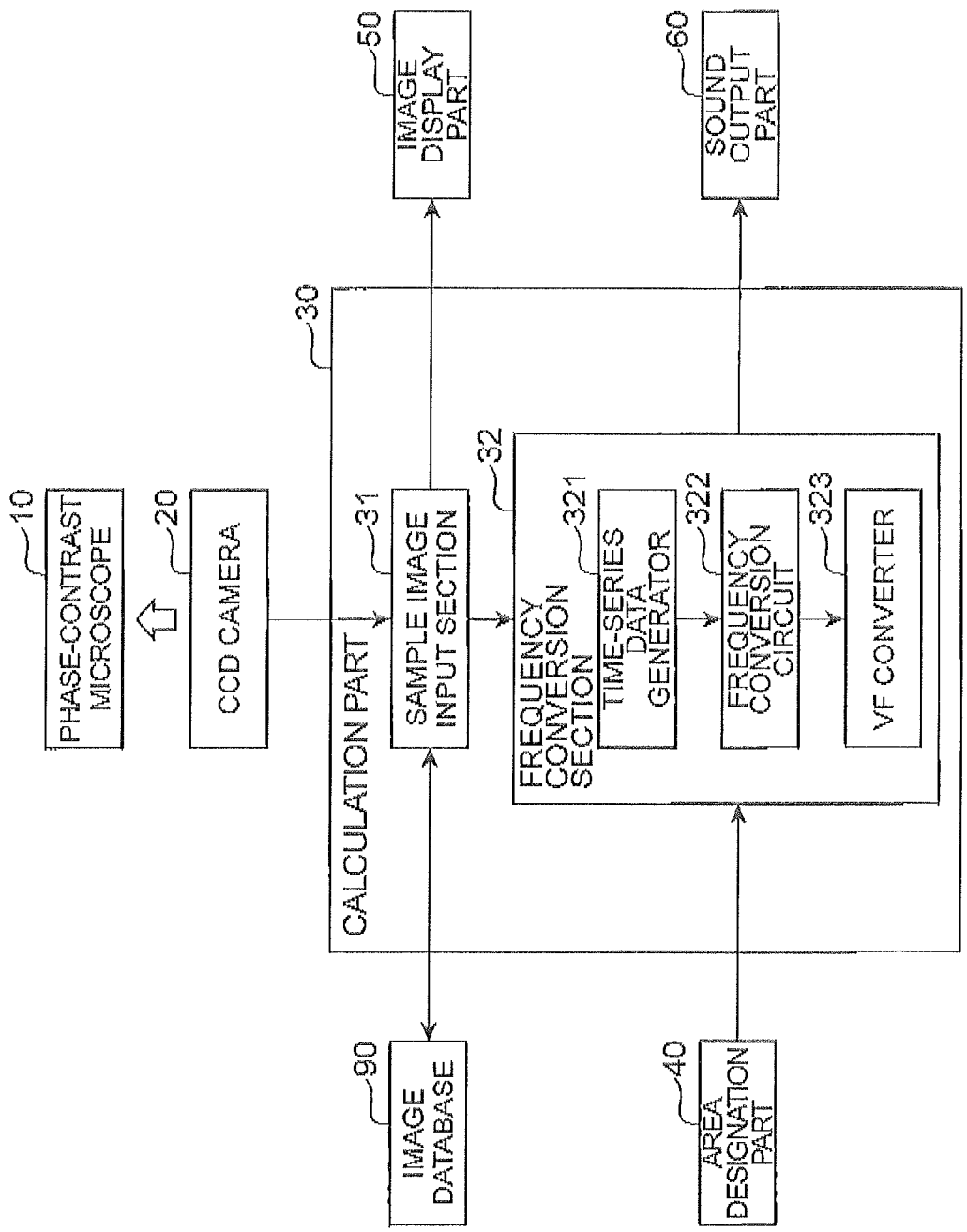
FIG. 2 is a functional block diagram imaging the structure of the cell stethoscope 1 in accordance with the first embodiment of the present invention.

To begin with, the structure of the cell stethoscope 1 (sample identification device) in accordance with the first embodiment of the present invention will be explained with reference to FIGS. 1 and 2. FIGS. 1 and 2 image the structure of the cell stethoscope 1. As illustrated in FIGS. 1 and 2, the cell stethoscope 1 is constituted by a phase-contrast microscope 10, a CCD camera 20, a calculation part 30, an area designation part 40 (area designation means), an image display part 50 (image display means), and a sound output part 60 (sound output means). The CCD camera 20, area designation part 40, image display part 50, and sound output part 60 are connected to the calculation part 30 so as to allow communications therewith. The individual constituents of the cell stethoscope 1 will be explained in detail in the following.

Phase-Contrast Microscope 10

The phase-contrast microscope 10 provides an observer with the form of a cell (sample) two-dimensionally. The phase-contrast microscope 10 can use a principle by which the optical thickness of the cell is approximately converted into an optical intensity. The principle of operation of the phase-contrast microscope 10 can be represented, for example, by the following mathematical expression (1):

$$I = \|\exp(i\phi)\| \sim \phi \qquad (1)$$

In the above expression (1), I, i, and $\phi$ denote the luminance value, imaginary unit, and phase difference, respectively. "$\|\ldots\|$" indicates the absolute value of the value therewithin. By using the phase-contrast microscope 10 based on the above expression (1), the observer can observe changes in the refractive index and physical thickness of the cell as luminance information.

CCD Camera 20

The CCD camera 20 captures an image of the form of the cell displayed by the phase-contrast microscope 10. The CCD camera 20 outputs the captured image information to the calculation part 30.

Calculation Part 30

The calculation part 30 carries out various calculations in the cell stethoscope 1. The calculation part 30 is physically constructed as a typical computer system including a CPU, a main storage unit such as ROM and RAM, a communication module such as a network card for exchanging data with other constituents, and an auxiliary storage unit such as a hard disk, which are not depicted. Functions of the calculation part 30 which will be explained later are achieved by reading predetermined computer software onto hardware such as the CPU, ROM, and RAM, so as to operate the communication module and the like under the control of the CPU and read and write the data in the main and auxiliary storage units.

The calculation part 30 functionally comprises a sample image input section 31 (image input means) and a frequency conversion section 32 (conversion means) as illustrated in FIGS. 1 and 2.

Sample Image Output Section 31

The sample image input section 31 inputs the image information captured by the CCD camera 20. The calculation part 30 may be equipped with a frame grabber card as a communication module. In this case, through the frame grabber card, the sample image input section 31 can input the image information captured by the CCD camera 20. The sample image input section 31 can output the inputted image information to the frequency conversion section 32 and image display part 50.

Image Display Part 50

For convenience of explanation, the image display part 50 will be explained first. As illustrated in FIG. 1, the image display part 50 is a display device such as a monitor, for example, and shows the image information of the cell fed from the sample image input section 31 in the calculation part 30 such that it is visible to the observer.

Area Designation Part 40

Figure 3:
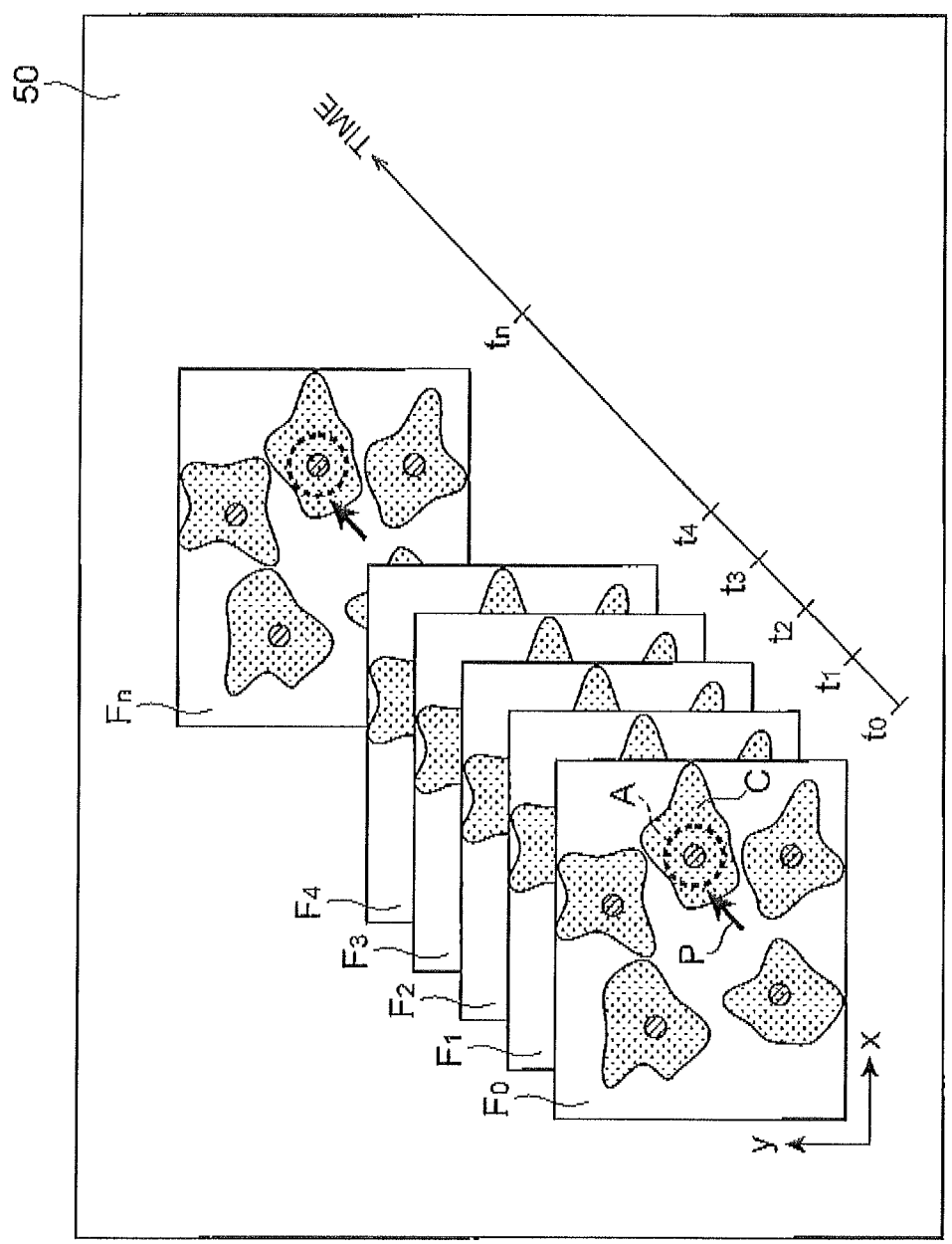
FIG. 3 is a chart imaging a state where a fixed area is designated by an area designation part 40.

The area designation part 40 will now be explained. The area designation part 40 is an input device such as a mouse or pointer, for example, for designating a fixed area in image information in response to an operation carried out by the observer while viewing the image information displayed on the display screen of the image display part 50. FIG. 3 is a chart imaging a state where a fixed area A in image information of a cell C is designated by the area designation part 40. FIG. 3 schematically depicts five cells, while a circle in one cell represents a cell nucleus. As illustrated in FIG. 3, the display screen of the image display part 50 shows image information of the cell C by respective frames (frames F0, F1, . . . , Fn each having xy coordinates) of unit times (t0, t1, . . . , tn). The observer can freely move an arrow P in the display screen by operating the mouse or pointer. The arrow P is overlaid on the phase difference images (frames F0, F1, . . . , Fn). FIG. 3 images that an area A which is a fixed area in the phase difference images is designated by the observer. The observer can designate the area A by dragging the arrow P with the mouse. Though not depicted, the observer can designate a single point in a cell to be observed without being limited by the area, for example, by clicking the mouse. The area designation part 40 outputs information specifying thus designated fixed area (or single point), e.g., information representing xy coordinate groups or coordinates in the frames F0, F1, . . . , Fn, to the frequency conversion section 32.

Frequency Conversion Section 32

Referring to FIGS. 1 and 2 again, the explanation will now return to the calculation part 30. The frequency conversion section 32 is one in which, when the image information and the information specifying the fixed area designated by the observer are fed from the sample image input section 31 and area designation part 40, respectively, vibration information of the cell in the fixed area in the image information is frequency-converted into sound information. As illustrated in FIG. 2, the frequency conversion section 32 functionally comprises a time-series data generator 321, a frequency conversion circuit 322, and a VF converter 323.

Time-Series Data Generator 321

The time-series data generator 321 is one which, upon receiving the inputs from the sample image input section 31 and area designation part 40, generates time-series data $S(tn)$ according to a luminance value $Ii$ in coordinates or a coordinate group in the designated fixed area. The time-series data $S(tn)$ made by the time-series data generator 321 is represented by the following mathematical expression (2) or (3), for example.

Expression (2) represents the time-series data $S(tn)$ in the case where the area designation part 40 designates only one point in the cell:

$$S(tn)=\alpha Ii(tn)+\beta \quad (2)$$

In the above expression (2), the subscript i denotes the coordinate position $(Xi, Yi)$ in the image information, $\alpha$ a multiplication factor, $\beta$ an offset value, and to a time parameter. Here, $\alpha$ is a parameter corresponding to the vertical adjustment knob in the oscilloscope, i.e., the signal intensity multiplication factor. When a vibration of about 1/10000 of the cell size is to be observed, the value of $\beta$ is preferably set such that the DC component becomes zero.

Expression (3) represents the time-series data $S(tn)$ in the case where the area designation part 40 designates a fixed area of the cell:

$$S(tn)=\Sigma[\alpha_i Ii(tn)+\beta i] \quad (3)$$

In the above expression (3), as in the above expression (2), the subscript i denotes the coordinate position $(Xi, Yi)$ in the image information, $\alpha_i$ a multiplication factor at the coordinate position $(Xi, Yi)$, $\beta_i$ an offset value at the coordinate position $(Xi, Yi)$, and to a time parameter.

After generating the time-series signal $S(tn)$ represented by the above-mentioned expressions (2) or (3), the time-series data generator 321 inputs thus generated time-series signal $S(tn)$ to the frequency conversion circuit 322 as a time-series signal $S1(tn)$.

Frequency Conversion Circuit 322, Part 1

The frequency conversion circuit 322 frequency-converts the time-series signal $S1(tn)$ fed from the time-series data generator 321 into a time-series signal $S2(tn)$. The time-series signal $S1(tn)$ has a frequency band of f1, which is a signal in a frequency band to be observed by the observer but a signal in a frequency band inaudible to humans. The time-series signal $S2(tn)$ has a frequency band of f2, which is a signal in a frequency band audible to humans. That is, the frequency conversion circuit 322 inputs a signal inaudible to humans from the time-series data generator 321 and frequency-converts it into an audible signal.

Figure 4:
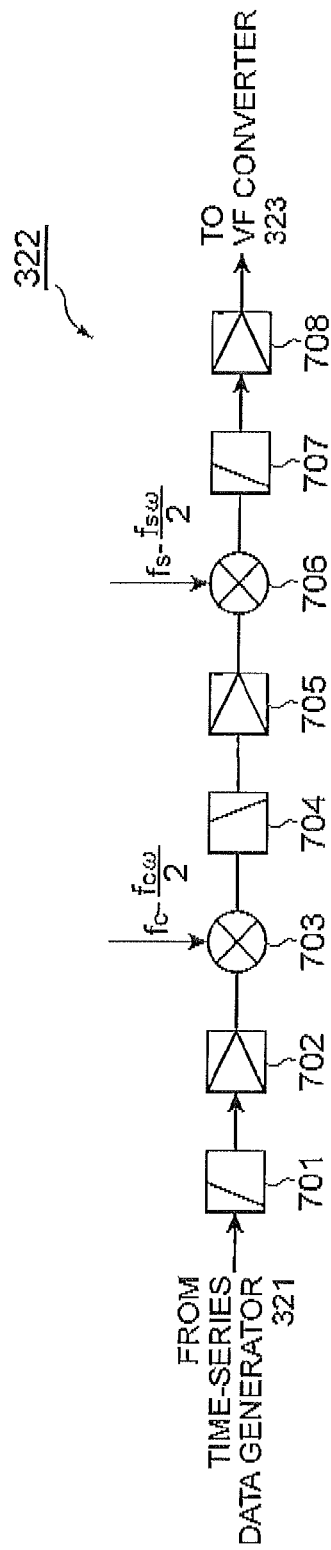
FIG. 4 is an example of circuit diagrams of a frequency conversion circuit 322.

FIG. 4 illustrates an example of the circuit structure of the frequency conversion circuit 322. As illustrated in FIG. 4, the frequency conversion circuit 322 comprises a high-pass filter 701, an amplifier 702, a multiplier 703, a low-pass filter 704, an amplifier 705, a multiplier 706, a high-pass filter 707, and an amplifier 708. By having the structure illustrated in FIG. 4, the frequency conversion circuit 322 frequency-converts the time-series signal S1(*tn*) into the time-series signal S2(*tn*). In the frequency conversion circuit 322, fc and fs denote the center frequency of the frequency band f1 and the center frequency of the desirable frequency band f2 in the audible range of the observer, respectively. Therefore, when f1 has a bandwidth of few, the upper and lower limits of f1 are fc+(fcw/2) and fc−(fcw/2), respectively. When f2 has a bandwidth of fsw, the upper and lower limits of f2 are fs+(fsw/2) and fs−(fsw/2), respectively.

In the time-series signal S1(*tn*) fed into the frequency conversion circuit 322, only the frequency components at fc−(fcw/2) and higher are initially transmitted through the high-pass filter 701 as illustrated in FIG. 4. Subsequently, these frequency components are amplified to a desirable signal intensity by the amplifier 702 and then are multiplied with a local oscillator signal at a frequency of fc−(fcw/2) by the multiplier 703. The foregoing operation by the multiplier 703 is also referred to as down-converting. Here, the observer may be allowed to select the frequency fc−(fcw/2) of the local oscillator signal by using the area designation part 40. When the area designation part 40 is a mouse, for example, the observer may be allowed to perform the selection by rotating the wheel of the mouse. In this case, the bandwidth fcw may be fixedly set beforehand. Even when the original signal S1(*tn*) is at a frequency exceeding the human audible range, the foregoing structure can frequency-convert it into the human audible range.

Next, since the signal issued from the multiplier 703 includes a difference frequency and a sum frequency, the sum frequency is cut off by the low-pass filter 704, so as to output the difference frequency. The resulting signal is subsequently amplified by the amplifier 705 to a desirable signal intensity.

Then, the signal issued from the amplifier 705, which includes frequencies in a low range (e.g., 20 Hz or lower in general) inaudible to humans, is frequency-converted by the multiplier 706 to a frequency band to which the observer's hearing is most sensitive. This is performed by the multiplier 706 multiplying the signal issued from the amplifier 705 with the local oscillator signal at the frequency of fs−(fsw/2). The foregoing operation by the multiplier 706 is also referred to as up-converting. The up-converting is effective in avoiding the inaudible sound range of 20 Hz or lower and further effective in converting the signal frequency to the frequency band to which the observer is most sensitive. As a method of selecting fs up-converting when the area designation part 40 is a mouse, for example, one in which the observer freely selects fs by tilting the wheel of the mouse leftward and rightward is favorable.

Subsequently, the high-pass filter 707 takes out only the sum frequency from the sum and difference frequencies issued from the multiplier 706. Thereafter, the sum frequency was amplified by the amplifier 708, so as to yield the time-series signal S2(*tn*) after frequency conversion. The frequency conversion circuit 322 outputs thus obtained time-series signal S2(*tn*) to the VF converter 323. Though two multipliers 703, 706 are used in the foregoing explanation concerning the frequency conversion circuit 322, the frequency conversion circuit 322 may be constructed by one multiplier when the signal at the frequency fc−(fcw/2) and the signal at the frequency fs−(fsw/2) are multiplied in a single multiplication.

Frequency Conversion Circuit 322, Part 2

Figure 5:
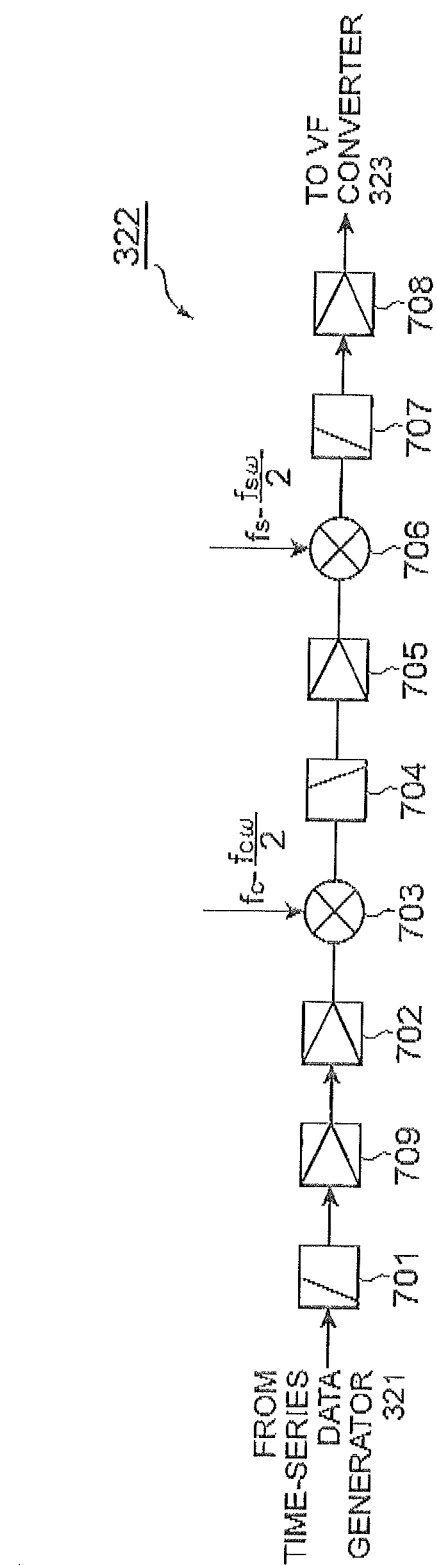
FIG. 5 is a circuit diagram of the frequency conversion circuit 322 in another mode.

Another mode of the frequency conversion circuit 322 will now be explained with reference to FIG. 5. FIG. 5 is a circuit diagram of the frequency conversion circuit 322 in this mode. As illustrated in FIG. 5, the frequency conversion circuit 322 in this mode further comprises a differentiator 709 in addition to the whole structure of the frequency conversion circuit 322 in FIG. 4.

In the time-series signal S1(*tn*) fed into the frequency conversion circuit 322, only the frequency components at fc−(fcw/2) and higher are initially transmitted through the high-pass filter 701 as illustrated in FIG. 5. Subsequently, the output signal from the high-pass filter is fed into the differentiator 709. The differentiator 709 acts to suppress the DC component of the signal and emphasize the temporal change in the signal. Therefore, the frequency conversion circuit 322 including the differentiator 709 is a particularly effective frequency conversion circuit when the DC component is large while the change is small. The output signal from the differentiator 709 is fed into the amplifier 702. The operations subsequent to the amplifier 702 are the same as those in the frequency conversion circuit 322 of FIG. 4 and thus will not be explained. Passing the output signal from the high-pass filter 701 through the differentiator 709 by n times can perform the nth-order differentiation of the output signal. Though not depicted, the differentiator 709 may be disposed behind the multipliers 703, 706, i.e., in front of the amplifier 708, in FIG. 5.

Frequency Conversion Circuit 322, Part 3

Figure 6:
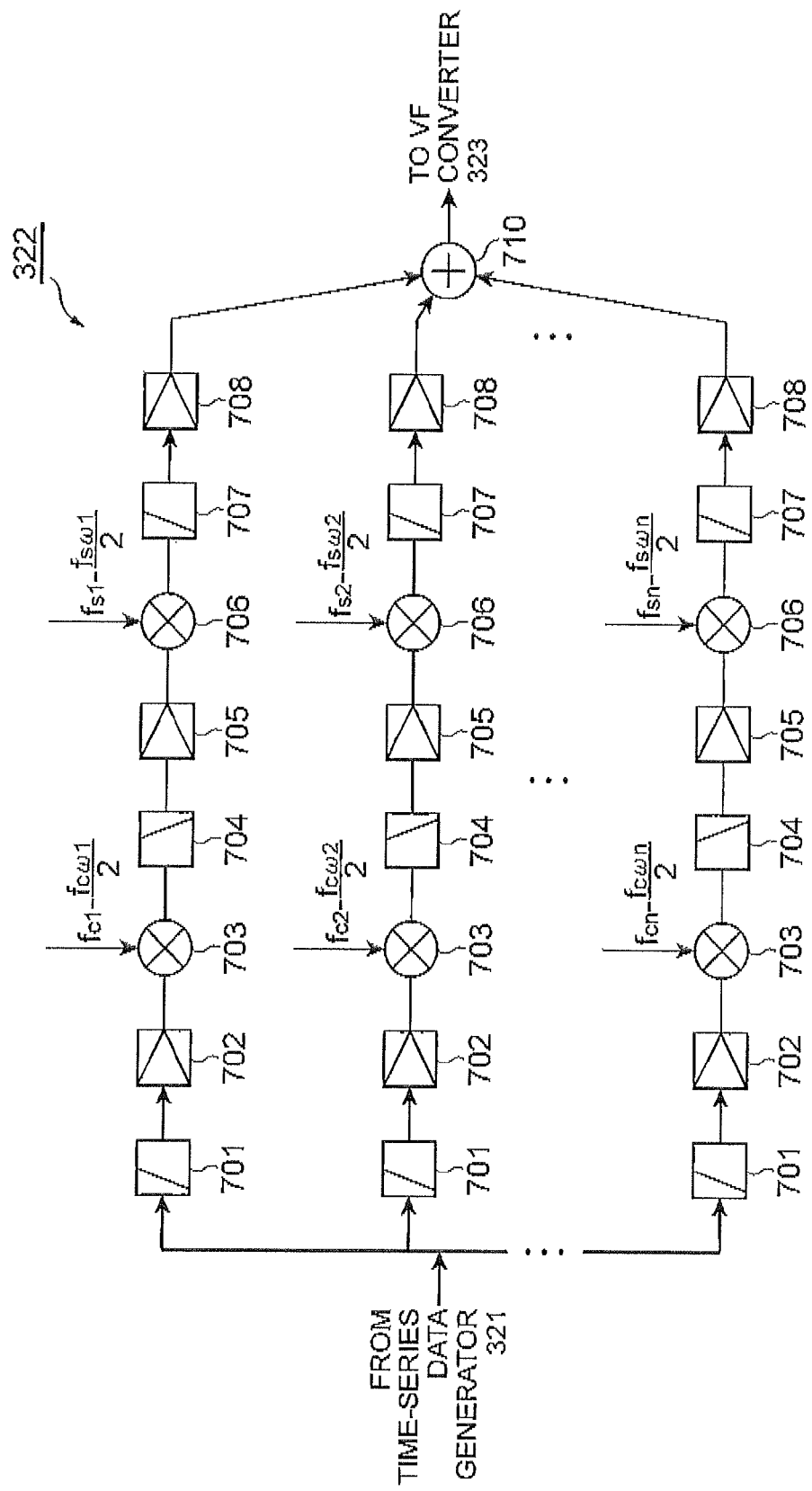
FIG. 6 is a circuit diagram of the frequency conversion circuit 322 in still another mode.

Still another mode of the frequency conversion circuit 322 will now be explained with reference to FIG. 6. FIG. 6 is a circuit diagram of the frequency conversion circuit 322 in this mode. M illustrated in FIG. 6, the frequency conversion circuit 322 in this mode comprises a plurality of frequency conversion circuits (hereinafter referred to as "frequency converters") each of which is the one explained above with reference to FIG. 4, while their outputs are fed into an adder 710. The adder 710 adds the outputs from the plurality of frequency converters, so as to generate the time-series signal S2(*tn*), and outputs thus generated time-series signal S2(*tn*) to the VF converter 323. In FIG. 6, respective local oscillator signals fed into the frequency converters are distinguished from each other by subscripts of 1 to n. Though not depicted, the frequency converter circuit explained above with reference to FIG. 5 may be employed as the "frequency converter".

VF Converter 323

Figure 7:
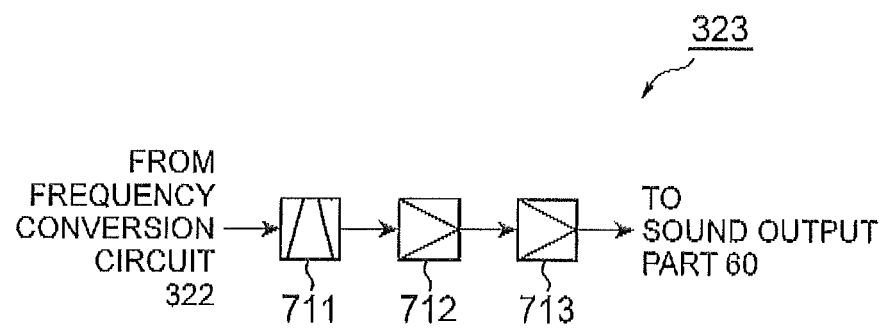
FIG. 7 is an example of circuit diagrams of a VF converter 323.

The VF converter 323 converts the strength of the time-series signal S2(*tn*) fed from the frequency conversion circuit 322 into a pitch. FIG. 7 illustrates an example of circuit structures of the VF converter 323. As illustrated in FIG. 7, the VF converter 323 comprises a high-pass filter 711, a VF converter device 712, and an amplifier 713. Since humans can more easily distinguish sounds by their pitches than by their strengths, converting the strength of sound information into a pitch thereof by the structure illustrated in FIG. 7 is effective in raising the working efficiency when the observer identifies the cell according to the sound information. The VF converter 323 outputs a signal representing the result of conversion to the sound output part 60.

Though not depicted, when the time-series signal S(tn) generated by the time-series data generator 321 has already fell within the human audible range, the time-series data generator 321 may output the time-series signal S(tn) as it is to the VF converter 323 by bypassing the frequency conversion circuit 322. In this case, though not depicted, means for determining whether or not the time-series signal S(tn) falls within the human audible range may be provided. Though the frequency conversion circuit 322 and VF converter 323 are achieved by an electric circuit in the foregoing explanation concerning the frequency conversion section 32, frequency conversion and VF conversion may be carried out by numeric calculations on a computer.

Sound Output Part 60

The sound output part 60 inputs a signal within the human audible range from the VF converter 323 and outputs this signal as a sound to the observer. The sound output part 60 may be constituted by a headphone or speaker, for example. When the sound to be outputted to the observer changes within a predetermined time interval of 2 ms, for example, the sound output part 50 may keep outputting the sound before the change as a reverberant sound during the predetermined time interval. The time interval of 2 ms is one corresponding to the time resolution of human auditory sense and may be changed as appropriate.

Operations of the Cell Stethoscope 1

Figure 8:
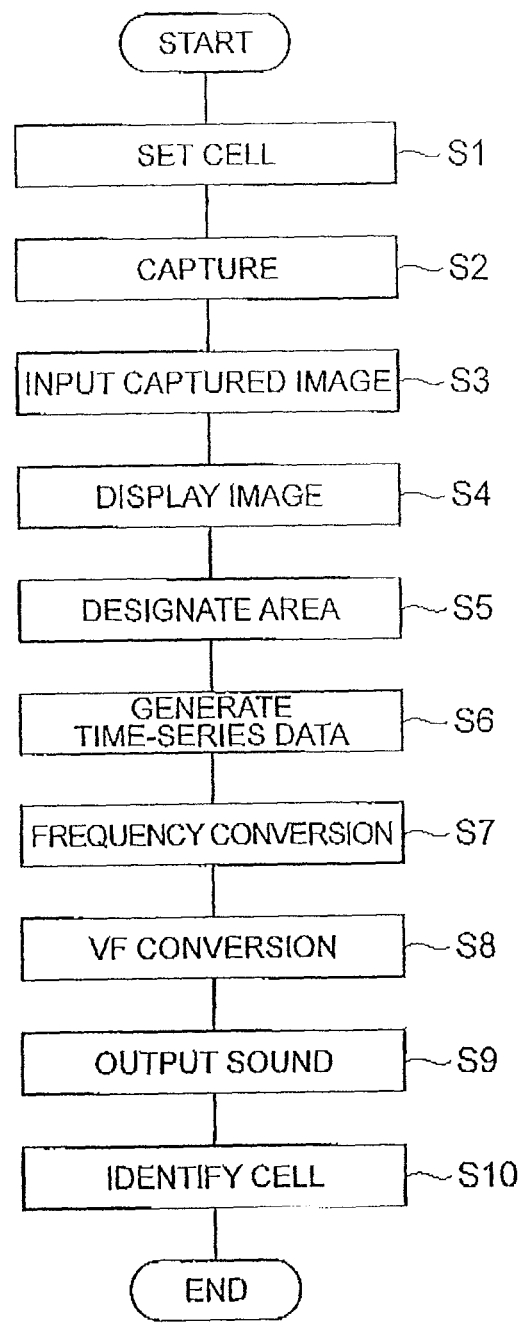
FIG. 8 is a flowchart illustrating operations carried out according to the cell stethoscope 1.

Operations carried out according to the cell stethoscope 1 will now be explained with reference to FIG. 8. FIG. 8 is a flowchart illustrating operations carried out according to the cell stethoscope 1.

First, a cultured cell as a sample is set on a stage of the phase-contrast microscope 10. After placing a Petri dish culturing the cell on the stage of the phase-contrast microscope 10, the observer adjusts a focal point through an eyepiece (step S1).

Subsequently, the CCD camera 20 captures the form of the cultured cell displayed by the phase-contrast microscope 10. The CCD camera 20 outputs thus captured image information to the sample image input section 31 of the calculation part 30 (step S2).

Then, the sample image input section 31 inputs the image information captured by the CCD camera 20 and outputs it to the time-series data generator 321 of the frequency conversion section 32 and the image display part 50 (step S3 or image input step).

Thereafter, the image display part 50 displays the image information of the cultured cell fed from the sample image input section 31 of the calculation part 30 such that it is visible to the observer (step S4 or image display step).

Next, in response to an operation carried out by the observer according to the image information displayed on the display screen of the image display part 50, the area designation part 40 designates a fixed area in the image information as illustrated in FIG. 3, for example. The area designation part 40 outputs information specifying thus designated fixed area to the time-series data generator 321 of the frequency conversion section 32 (step S5 or area designation step).

Subsequently, upon receiving inputs from the sample image input section 31 and area designation part 40 at steps S3 and S5, the time-series data generator 321 generates time-series data $S(tn)$ according to the luminance value $Ii$ in coordinates or a coordinate group in the designated fixed area. The time-series data generator 321 feeds thus generated time-series signal $S(tn)$ as a time-series signal $S1(tn)$ into the frequency conversion circuit 322 (step S6).

Then, the frequency conversion circuit 322 frequency-converts the time-series signal $S1(tn)$ fed from the time-series data generator 321 into a time-series signal $S2(tn)$. The time-series signal $S1(tn)$ is a signal in a frequency band inaudible to humans, while the time-series signal $S2(tn)$ is a signal in a frequency band audible to humans. The frequency conversion circuit 322 outputs the frequency-converted time-series signal $S2(tn)$ to the VF converter 323 (step S7 or conversion step).

Thereafter, the VF converter 323 converts the strength of the time-series signal $S2(tn)$ fed from the frequency conversion circuit 322 into a pitch and outputs it to the sound output part 60 (step S8).

Subsequently, the sound output part 60 inputs the signal within the human audible range from the VF converter 323 and outputs this signal as a sound to the observer (step S9 or sound output step).

Then, the observer identifies a "lively" cultured cell according to the output sound from the sound output part 60 (step S10).

Actions and Effects of the Cell Stethoscope 1

Actions and effects of the cell stethoscope 1 in accordance with the first embodiment will now be explained. The cell stethoscope 1 in accordance with the first embodiment allows the observer to designate an area to be identified while locating a viewpoint at the image display part 50 and identify a cell while hearing the output sound of the sound output part 60. That is, without moving the viewpoint between the time for designating the subject to be identified and the time for identifying it, the observer can identify the cell according to the output sound from the sound output part 60. Therefore, the first embodiment prevents the viewpoint from frequently shifting in the cell identification procedure, thereby making it possible to raise the working efficiency when identifying a cell having a desirable vibration state.

The first embodiment also allows the observer to designate an area to be identified while viewing the image displayed on the image display part 50. That is, at the same viewpoint as that at the time of identifying the cell, the observer can designate a partial area in an area representing the cell without moving the cell itself. This enhances the operability and throughput, whereby the working efficiency can further be raised.

In the first embodiment, the differentiator 709 is disposed in front of the multipliers 703, 706. Incorporating the differentiator 709 effective in suppressing the DC component and emphasizing a change into the frequency conversion section 32 allows the observer to hear a higher-pitched sound when the change in vibration of the cell is stronger. As a result, the observer can acquire information concerning the vibration speed of the cell more efficiently, thereby raising the working efficiency.

The first embodiment allows a plurality of frequency converters included in the frequency conversion section 32 to perform frequency conversion processes in parallel, while the adder 710 adds the outputs from the plurality of frequency converters. This enables the frequency conversion section 32 to convert cell vibration information into sound information rapidly and efficiently for a plurality of frequency bands as well.

The first embodiment allows the sound output part 60 to provide the observer with sound information whose strength is converted into a pitch by the frequency conversion section 32. As a result, the observer can acquire information concerning the vibration speed of the cell more efficiently, thereby raising the working efficiency.

When the output sound of the sound output part 60 changes in an interval shorter than a time interval corresponding to the time resolution of human auditory sense, i.e., when the observer cannot recognize the change in the output sound of the sound output part 60, for example, the sound output part 60 keeps outputting the output sound before the change as a reverberant sound during the time interval corresponding to the time resolution of human auditory sense in the first embodiment. As a consequence, the sound output part 60 allows the observer to recognize even an output sound changed in an interval shorter than the time interval corresponding to the time resolution of human auditory sense. This is useful in particular when the time interval corresponding to the time resolution of human auditory sense is set to 2 ms.

Second Embodiment

Structure of a Cell Stethoscope 2

Figure 9:
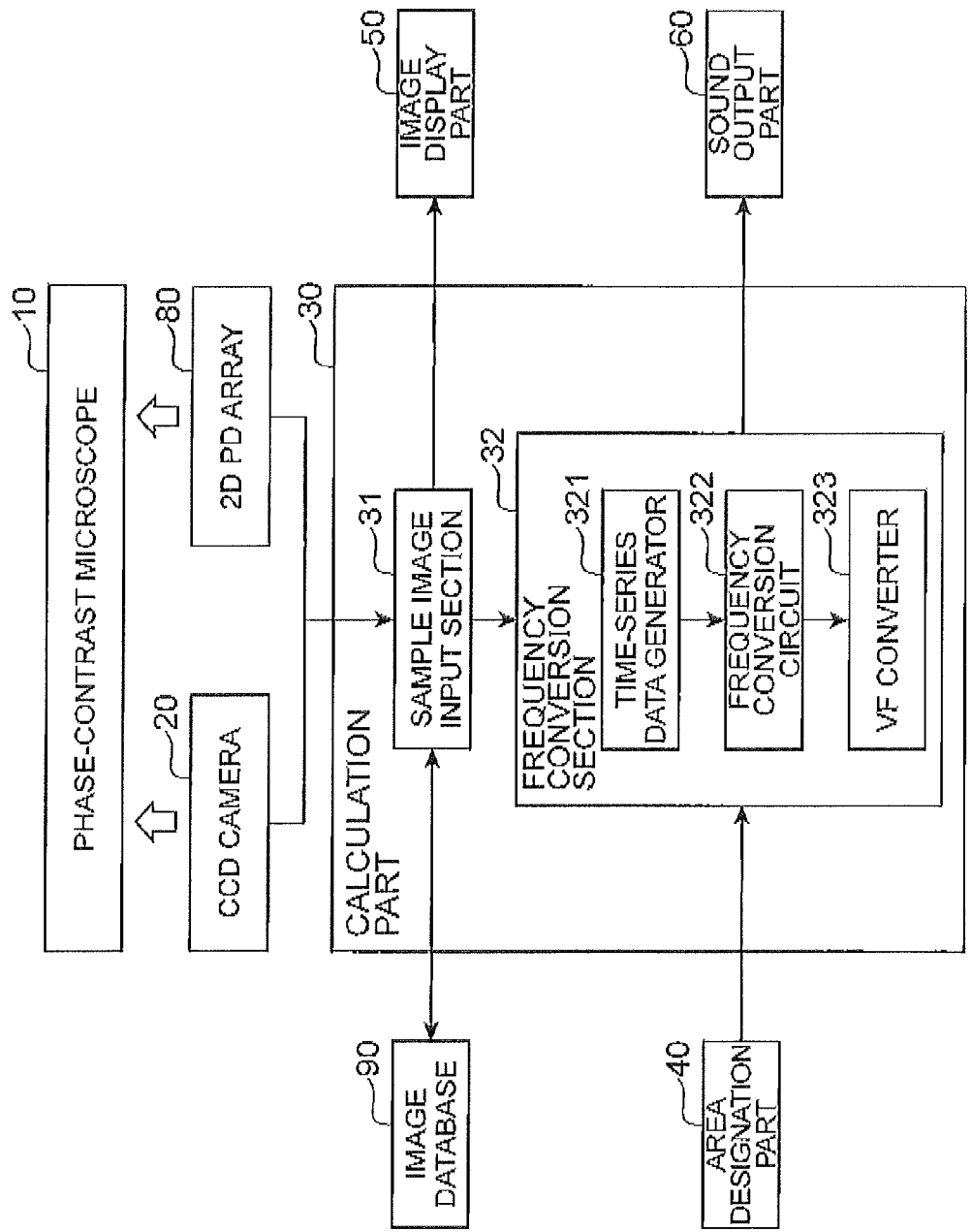
FIG. 9 is a functional block diagram imaging the structure of a cell stethoscope 2 in accordance with a second embodiment of the present invention.

The cell stethoscope 2 in accordance with the second embodiment of the present invention will now be explained. FIG. 9 is a functional block diagram imaging the structure of the cell stethoscope 2. As illustrated in FIG. 9, the cell stethoscope 2 includes all the constituents of the cell stethoscope 1 illustrated in FIG. 2 and further comprises a two-dimensional PD array 80 (two-dimensional photodiode array) and an image database 90. The following will explain the constituents of the cell stethoscope 2, while focusing on differences from the cell stethoscope 1 in accordance with the first embodiment.

By photodetection, the two-dimensional PD array 80 captures the form of a cell displayed by the phase-contrast microscope 10. In general, the two-dimensional PD array 80 can capture the form of the cell displayed by the phase-contrast microscope 10 with a higher dynamic range for higher-frequency vibrations as compared with the CCD camera 20. The two-dimensional PD array 80 outputs the captured image information to the sample image input section 31 in the calculation part 30.

The image database 90 is a database storing cell image information beforehand. The sample image input section 31 of the calculation part 30 can read the cell image information by connecting with the image database 90. The image database 90 is placed outside of the calculation part 30 in FIG. 9 but may be inside thereof. The image database 90 may also be a CD or DVD, for example.

As explained in the foregoing, there are a plurality of input sources for feeding image information to the sample image input section 31 of the calculation part 30 in the cell stethoscope 2 of the second embodiment. The sample image input section 31 can input image information from any of the plurality of input sources. The sample image input section 31 may further comprise means for appropriately selecting one or a plurality of the input sources according to working states.

Actions and Effects of the Cell Stethoscope 2

Actions and effects of the cell stethoscope 2 in accordance with the second embodiment will now be explained. By inputting cell image information from the two-dimensional PD array 80, the cell stethoscope 2 in accordance with the second embodiment can identify a cell in a desirable vibration state in real time with a high detection sensitivity.

By inputting cell image information from the image database 90, the cell stethoscope 2 in accordance with the second embodiment can identify a cell according to the vibration information of the sample acquired beforehand even offline.

Though preferred embodiments of the present invention have been explained in the foregoing, the present invention is not limited to the above-mentioned embodiments as a matter of course.

For example, when the area designation part 40 designates such an area as to surround one cell completely, the volume change in the single cell as a whole may be issued as an output sound.

The time-series generator 321 may be constructed such as to subject the time-series data S(tn) to two-dimensional Fourier transform per frame. In this case, the temporal change in power spectrum intensity of a desirable spatial frequency alone can be taken as the time-series data S(tn).

Though the above-mentioned embodiments explain the case using the VF converter 323, it may be omitted in the structure of the frequency conversion section 32. In the latter case, the frequency conversion section 32 directly outputs the time-series signal S2(tn) to the sound output part 60. In the case where the differentiator 709 is included in the constituents of the frequency conversion circuit 322 while omitting the VF converter 323, the observer hears a louder sound when the change in vibration of the cell is stronger. In the case where both the VF converter 323 and the differentiator 709 are included in the constituents, on the other hand, the observer hears a higher-pitched sound when the change in vibration of the cell is stronger.

Though the above-mentioned embodiments employ the phase-contrast microscope 10 as a microscope, this is not restrictive, whereby any microscope can be utilized in place of the phase-contrast microscope 10 as long as it is equipped with a mechanism capable of providing the observer with the form of a cell two-dimensionally. For example, using a quantitative phase microscope in which quantitativeness is imparted to the phase-contrast microscope yields the phase difference as luminance information without employing such approximation as that of the above-mentioned expression (1). The quantitative phase microscope in this case may be any of Mach-Zehnder and Michelson types and Mirau, Linnik, and common-path interferometers. The illumination method is not limited to transmitted-light illumination but may be reflected-light illumination (epi-illumination).

A differential interference contrast microscope may be employed in place of the phase-contrast microscope 10. This yields a phase-difference image between neighborhoods on a two-dimensional plane, whereby differential information between two points concerning a refractive index change or physical thickness can be obtained. As a result, common noises cancel each other out, whereby noise-resistant measurement can be carried out.

For observing fluctuations in fluorescence intensity as typified by fluorescence correlation spectroscopy, a fluorescence microscope may be employed in place of the phase-contrast microscope 10.

A laser scanning microscope may be employed in place of the phase-contrast microscope 10. The laser scanning microscope is one using a technique of acquiring a fluorescent image by scanning a cell two-dimensionally with a laser light beam employed as an illumination light source. When using the laser scanning technique of the laser scanning microscope, the device comprises a mechanism for emitting a laser beam at a position of a pointer indicated by the observer, a second light source for allowing the observer to observe the whole image of the cell two-dimensionally, and an optical system in which a dichroic mirror or the like combines the laser beam and the observation light source together and separates them from each other.

INDUSTRIAL APPLICABILITY

The present invention provides a sample identification device and a sample identification method which can raise the working efficiency when identifying a sample having a desirable vibration state.

The invention claimed is:

1. An apparatus for identifying a cell of a sample, the apparatus comprising:
   image input means configured to input image information of the sample from a microscope;
   image display means configured to display the image information to an observer;
   area designation means configured to designate a fixed area in the image information in response to an operation earned out by the observer according to the image information displayed by the image display means;

conversion means configured to convert vibration information of the sample in the fixed area into sound information having a frequency band audible to humans; and
sound output means configured to output the sound information to the observer.

2. The apparatus according to claim 1, wherein the conversion means comprises a frequency converter including at least one multiplier; and
wherein a differentiator is disposed in front of or behind the multiplier in the frequency converter.

3. The apparatus according to claim 2, wherein the conversion means comprises a plurality of frequency converters and an adder for adding outputs from the plurality of frequency converters.

4. The apparatus according to claim 1, wherein the conversion means further comprises means configured to convert a strength in the converted sound information into a pitch in the sound information.

5. The apparatus according to claim 1, wherein, when a sound outputted to the observer changes within a predetermined time interval, the sound output means keeps outputting the sound before the change as a reverberant sound during the predetermined time interval.

6. The apparatus according to claim 5, wherein the predetermined time interval is 2 ms.

7. The apparatus according to claim 1, wherein the image input means inputs the image information of the sample from a phase-contrast microscope and a two-dimensional photodiode array.

8. The apparatus according to claim 1, wherein the image input means inputs the image information of the cell sample from a database storing the image information of the cell sample beforehand.

9. A method of identifying a cell of a sample, the method comprising:
inputting image information of the sample from a microscope;
displaying the image information to an observer;
designating a fixed area in the image information in response to an operation carried out by the observer according to the displayed image information;
converting vibration information of the sample in the fixed area into sound information having a frequency band audible to humans; and
outputting the sound information to the observer.

10. A method of observing a cell of a sample, the method comprising:
inputting image data of at least a portion of the sample from a microscope;
acquiring vibration information of the sample based on the image data;
converting a frequency band of the vibration information into a frequency band audible to humans; and
emitting a sound based on the converted vibration information.

11. The method according to claim 10, wherein the image data is an image data of the sample in an area designated by an observer.

12. The method according to claim 10, further comprises converting a strength in the sound based on the converted vibration information into a pitch in the sound.

13. An apparatus for observing a cell of a sample, the apparatus comprising:
image input means configured to input image data of at least a portion of the sample from a microscope;
conversion means configured to acquire vibration information of the sample based on the image data and convert a frequency band of the vibration information into a frequency band audible to humans; and
sound output means configured to emit a sound based on the converted vibration information.

14. The apparatus according to claim 13, wherein the image data is an image data of the sample in an area designated by an observer.

15. The apparatus according to claim 13, wherein the conversion means further comprises means configured to convert a strength in the sound based on the converted vibration information into a pitch in the sound.

* * * * *